United States Patent
Briar

[11] 3,865,222
[45] Feb. 11, 1975

[54] ELECTROMAGNETIC SPRING-WOUND CLUTCH

[75] Inventor: John R. Briar, Dayton, Ohio
[73] Assignee: General Motors Corporation, Detroit, Mich.
[22] Filed: Mar. 8, 1973
[21] Appl. No.: 339,199

[52] U.S. Cl. .............. 192/48.2, 64/30 C, 192/84 T
[51] Int. Cl. .......................... F16d 27/10, F16d 7/02
[58] Field of Search ............... 192/48.2, 48.3, 84 T; 64/30 R, 30 C

[56] References Cited
UNITED STATES PATENTS

| | | | |
|---|---|---|---|
| 2,952,146 | 9/1960 | Bruck | 64/30 C |
| 3,092,983 | 6/1963 | Huber | 64/30 C |
| 3,120,219 | 2/1964 | Nallinger | 192/48.2 X |
| 3,268,044 | 8/1966 | Lippman | 192/48.2 X |
| 3,315,773 | 4/1967 | Aschauer | 192/48.2 |
| 3,735,847 | 5/1973 | Brucken | 192/84 T |

Primary Examiner—Allan D. Herrmann
Attorney, Agent, or Firm—John P. Moran

[57] ABSTRACT

The disclosed electromagnetic spring-wound clutch includes an input pulley including a pole member and a hub member, a driven member axially aligned with the pulley hub member, an output shaft, a flanged hub member secured to the output shaft, a torque limiter mechanism operatively connected intermediate the driven member and the flange of the hub member, a coil-wound spring mounted around the pulley hub member and the driven member and having one end thereof secured to the driven member, and an armature ring member operatively connected between the other end of the spring and the pole member for causing the spring to wrap around and grippingly engage the pulley hub member upon energization of the coil to thus drive the driven member, the torque limiter mechanism, the flanged hub member, and the output shaft.

3 Claims, 1 Drawing Figure

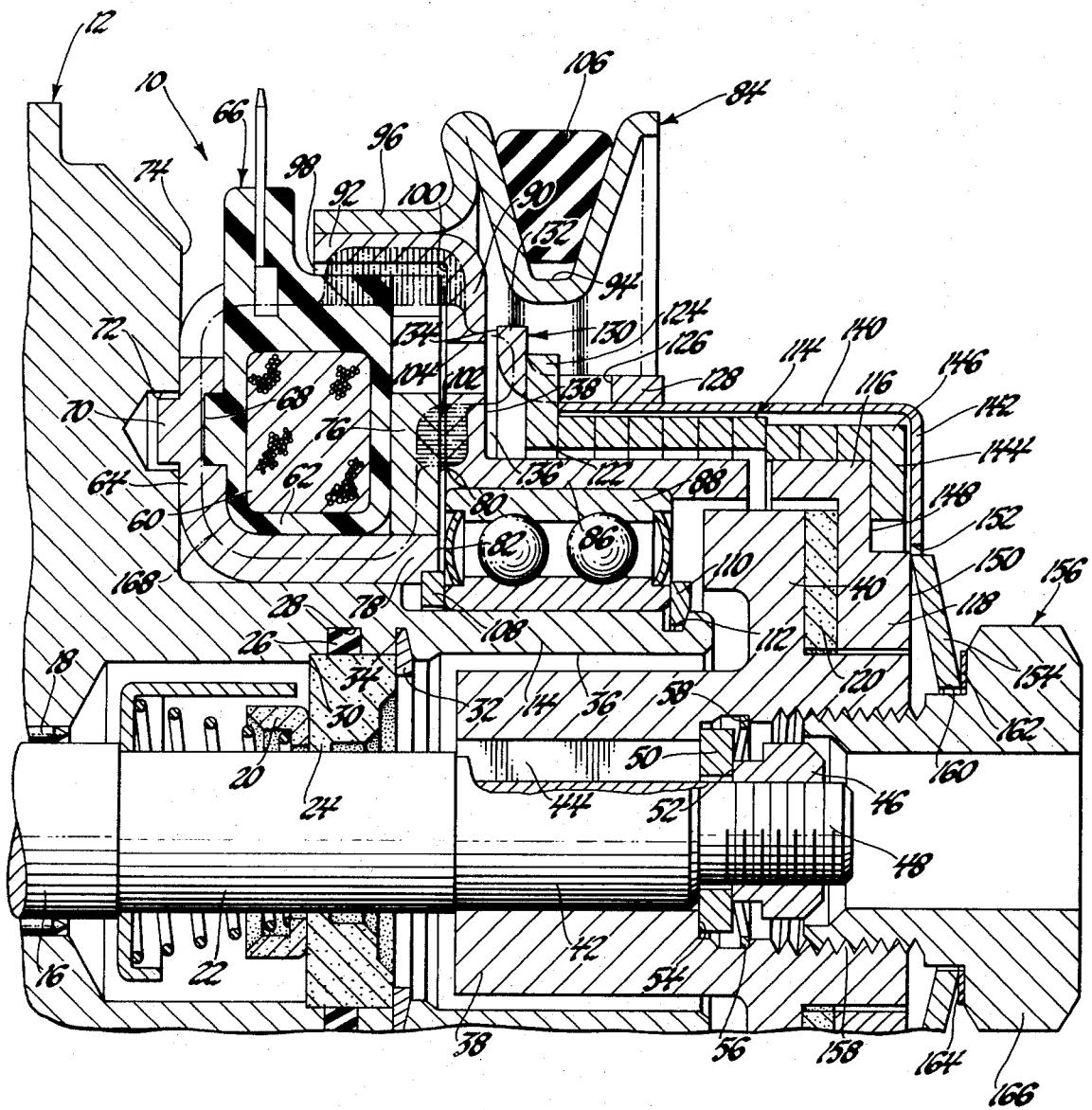

ELECTROMAGNETIC SPRING-WOUND CLUTCH

This invention relates generally to clutches and, more particularly, to electromagnetic spring-wound clutches.

A general object of the invention is to provide an improved electromagnetic, wrap-spring type clutch arrangement.

Another object of the invention is to provide an improved electromagnetic spring-wound clutch including efficient, yet simplified means for adjustably limiting the torque on the output shaft.

A further object of the invention is to provide an electromagnetic spring-wound clutch including a friction ring mounted intermediate an output shaft hub member and a member driven by the spring wound therearound upon energization of the coil, a drawdown nut threadedly connected to the output shaft hub member, and a belleville spring mounted intermediate the head of the nut and a face of the driven member so as to exert a predetermined force on the driven member, friction ring and hub member combination to thereby limit the torque on the output shaft.

These and other objects and advantages of the invention will be apparent when reference is made to the following description and accompanying drawing, wherein:

The FIGURE is a fragmentary cross-sectional view illustrating an electromagnetic clutch embodying the invention.

Referring now to the drawing in greater detail, the FIGURE illustrates an electromagnetic spring-wound clutch 10 suitable for driving an air-conditioning compressor, represented generally at 12, on the forward end of which is formed a tubular extension 14. An output shaft 16 for driving the compressor 12 is rotatably mounted on needle bearings 18, extending outwardly through the tubular extension 14. A rotating shaft seal 20 is mounted around a reduced intermediate portion 22 of the shaft 16. The shaft seal 20 is in sealing engagement with a stationary seal ring 24, the latter being sealed to the tubular extension 14 by an O-ring-type seal ring 26 mounted in a groove 28 formed in the tubular extension 14. The seal ring 24 is confined axially between a shoulder 30 formed within the tubular extension 14 and a split locking ring 32 mounted in a groove 34 formed in the tubular extension 14. The inner bore of the tubular extension 14 is enlarged at 36 to facilitate assembly and removal of the locking ring 32, the stationary seal ring 24, and the rotating part of the shaft seal 20.

The enlarged inner bore 36 of the tubular extension 14 also provides space for the accommodation of the greater portion of a hub 38 of a radially extending flange member 40, the hub 38 being mounted upon a reduced end portion 42 of the shaft 16. The hub 38 is keyed to the output shaft 16 by a suitable key 44 and is held on the end portion 42 of the shaft 16 by a nut 46 threadedly connected to a threaded end portion 48 of the shaft 16, there being a washer member 50 confined between the inner face 52 of the nut 46 and an adjacent face 54 of the hub 38. A retainer ring 56, seated against a shoulder 58 formed in the bore of the hub 38, also abuts against the washer member 50.

An annular electromagnetic coil 60 consisting of a predetermined number of turns is mounted around the tubular extension 14. The coil 60 is embedded within a suitable resin 62, such as epoxy or nylon or polyester resin, the assembly being mounted in an annular coil housing 64. A terminal assembly 66 is formed on the coil-resin assembly 60/62 and extends outwardly through a cut-out portion of the housing 64 as a means for energizing the coil 60.

The coil housing 64 is formed of paramagnetic material, such as steel or malleable iron, and is provided with a plurality of locking recesses 68 into which the resin 62 is cast. In addition, the coil housing 64 is provided with a plurality of integral projections 70 which extend within respective recesses 72 formed in the adjacent forward wall 74 of the compressor 12. A wall member 76 is secured to the inner cylindrical wall 78 of the coil housing 64 in any suitable manner, such as by being press-fitted thereon to form a fourth wall around the coil 60. The outer surface 80 of the wall member 76 is radially aligned with the end face 82 of the inner cylindrical wall 78.

A pulley assembly 84 includes a hub 86 mounted on bearings 88 around the tubular extension 14, a radially extending wall 90 formed on the hub 86 and having a first cylindrical flange 92 formed thereon, and a pulley groove portion 94 formed on a second cylindrical flange 96 secured to the first cylindrical flange 92 in any suitable manner. The cylindrical flange 92 extends past a portion of the coil housing 62, spaced a predetermined air gap or space 98 width apart therefrom. The location of the outer surface 100 of the radial wall 90 is such that a radial air gap or space 102 of a predetermined width exists between the outer surface 100 and the adjacent surface 80 of the wall member 76. A plurality of circumferentially aligned arcuate slots 104 are formed through the radial wall 90 at an intermediate location thereon. An engine-driven belt 106 is mounted in the pulley groove portion 94. The bearings 88 are axially confined between a washer-like bearing spacer 108 and a retainer ring 110 mounted in a groove 112 formed adjacent the end of the tubular extension 14.

A coil-wound spring assembly 114 is mounted around the pulley hub 86 and a cylindrical collar 116 formed on a driven member 118 separated from the radially extending flange member 40 by a friction disc 120. The innermost loop 122 of the spring 114 has a bent-end tab 124 formed thereon, extending outwardly through an opening 126 formed in a cylindrical portion 128 of a clutch armature ring 130. Thee ring 130 further includes a radial flanged portion 132 whose outer face 134 is mounted a predetermined air gap or space 136 width apart from the adjacent surface 138 of the radial pulley wall 90.

The spring assembly 114 is confined within a cylindrical wall 140 of a retaining cap 142 and, in its free state, the assembly 114 is spaced radially apart from the pulley hub 86 over the left portion of its length. The right portion of the spring assembly 114 is spaced radially apart from the cylindrical wall 140, being secured to the collar 116 of the driven member 118 by virtue of a tab 144 formed on the outermost loop 146 of the spring assembly 114 and mounted in a pocket or recessed portion 148 formed adjacent the end face 150 of the driven member 118. The cylindrical portion 128 of the armature ring 130 is slidably mounted around the cylindrical wall 140 of the retaining cap 142.

Referring now to the right end portion of the FIGURE, it may be noted that an opening 152 is formed in the end of the retaining cap 142. A belleville spring 154 is mounted radially within the opening 152 adjacent the end face 150 of the driven member 118. A draw-down nut 156 is threadedly mounted in a threaded end portion 158 of the hub 38, the belleville spring 154 being mounted around a central portion 160 of the nut 156 and being urged into contact with the end face 150 by a shim 162 mounted adjacent the inner face 164 of the head 166 of the nut 156.

OPERATION

In operation, the clutch 10 is engaged by the energization of the electromagnetic coil 60 via the terminal assembly 66 which causes the magnetic flux to traverse a path through the adjacent paramagnetic materials, as indicated by the dot-dash line 168. More specifically, the path of the flux is primarily from the coil 60 to the surrounding walls of the coil housing 64, to the cylindrical flange 92 formed on the coil housing 64, and thence to the radial wall 90 of the pulley assembly 84 outward of the arcuate slots 104.

The flux next crosses the radial gap 136 outwardly of the arcuate slots 104 from the radial wall 90 to enter the armature ring 130, from whence it once again crosses the radially extending gap 136 to the radial pulley wall 90 of the pulley assembly 84, inwardly of the arcuate slots 104. Then, the flux crosses the gap 102 to the wall member 76 to complete the circuit to the inner cylindrical wall 78 of the coil housing 64.

This arrangement provides a strong, two-pole magnetic clutch field which attracts the armature ring 130, effecting a face-to-face engagement with the radial wall 90 of the pulley assembly 84. Once this occurs, the left portion of the coil-wound spring assembly 114 is wound into gripping contact around the rotating hub 86 of the pulley assembly 84. Since the right portion of the spring assembly 114 is secured to the driven member 118 by virtue of the tab 144 being inserted in the pocket 148 formed in the driven member 118, the member 118 will thus be caused to rotate, in turn, tending to drive the friction ring 120, the flange member 40 and its hub 38, the output shaft 16, and the compressor 12 along therewith.

The torque to which the output shaft 16 is subjected is limited at a predetermined value by virtue of the setting of the draw-down nut 156, the threaded relationship of the latter with the threaded opening 158 in the hub 38 causing a particular force to be exerted by the belleville spring 154 on the face 150 of the driven member 118 and, hence, on the friction ring 120 and thence on the flange 40 of the hub 38. A direct drive will occur between the friction ring 120 and the adjacent members 40 and 118 until the predetermined torque is reached, at which point slippage will take place along one or both the faces of the friction ring 120 to thus limit the torque on the output shaft 16.

When the coil 60 is deenergized, nulling the magnetic attraction across the gaps 98, 102 and 136, the armature ring 130 will, of course, be released from the radial pulley wall 90, thereby releasing the bent-end tab 124 of the spring assembly 114, and thus permitting the latter to unwind from the pulley hub 86, thereby breaking the connection between the input pulley assembly 84 and the output shaft 16.

It should be apparent that the invention provides an efficient, yet simplified means for adjustably limiting the torque on the output shaft of an electromagnetic spring-wound clutch.

While but one embodiment of the invention has been shown and described, other modifications thereof are possible.

I claim:

1. An electromagnetic spring-wound clutch comprising an input pulley assembly including a hub member, a pulley groove portion and a pole member interconnecting said hub member and said pulley groove portion, an output shaft, a hub member mounted on said output shaft, a radial flange formed on an intermediate portion of said output hub member, a friction ring mounted around said output hub member adjacent said radial flange, a driven member mounted around said output hub member adjacent said friction ring, a cylindrical collar formed on said driven member and extending toward said pulley hub member and being axially aligned with said pulley hub member for relative rotation about a common axis, means for frictionally confining said friction ring intermediate said driven member and said radial flange, a stationary coil housing, said pole member being located a predetermined air space apart from said coil housing, an electromagnetic coil mounted in said coil housing, a coil-wound spring mounted around said pulley hub member and said output hub member and having one end thereof secured to said output hub member, and an armature ring member mounted around the other end of said coil-wound spring and movable axially relative thereto, said armature ring member being located a predetermined air space apart from said pole member, said coil when energized drawing said armature ring member axially through said last-mentioned air space into frictional contact with said pole member without axially moving said other end of said coil-wound spring while causing said spring to grippingly engage said pulley hub member and said cylindrical collar to thereby drive said driven member, said friction ring, said output hub member, and said output shaft.

2. An electromagnetic spring-wound clutch comprising an input pulley assembly including a hub member, a pulley groove portion and a pole member interconnecting said hub member and said pulley groove portion, said pole member including a radial wall portion and a cylindrical wall portion, an output shaft, a hub member mounted on said output shaft, a radial flange formed on an intermediate portion of said output hub member, a friction ring mounted around said output hub member adjacent said radial flange, a driven member mounted around said output hub member adjacent said friction ring, a cylindrical collar formed on said driven member and extending toward said pulley hub member and being axially aligned with said pulley hub member for relative rotation about a common axis, means for frictionally confining said friction ring intermediate said driven member and said radial flange, a stationary coil housing, said radial wall portion and said cylindrical wall portion each being located a predetermined air space apart from the side and peripheral wall portions of said coil housing, an electromagnetic coil mounted in said coil housing, a coil-wound spring mounted around said pulley hub member and said output hub member and having one end thereof secured to said output hub member, and an armature ring member mounted around the other end of said coil-wound spring and movable axially relative thereto, said armature ring member being located a predetermined air space apart from said radial wall portion of said pole member, said coil when energized drawing said armature ring member axially through said last-mentioned air space into frictional contact with said radial wall portion of said pole member without axially moving said other end of said coil-wound spring while causing said spring to grippingly engage said pulley hub member and said cylindrical collar to thereby drive said driven member, said friction ring, said output hub member, and said output shaft.

3. An electromagnetic spring-wound clutch comprising an input pulley assembly including a hub member, a pulley groove portion and a pole member interconnecting said hub member and said pulley groove portion, said pole member including a radial wall portion and a cylindrical wall portion, an output shaft, a hub member mounted on said output shaft, a radial flange formed on an intermediate portion of said output hub member, a friction ring mounted around said output hub member adjacent said radial flange, a driven member mounted around said output hub member adjacent said friction ring, a cylindrical collar formed on said driven member and extending toward said pulley hub member and being axially aligned with said pulley hub member for relative rotation about a common axis, a draw-down nut threadedly secured to the end portion of said output hub member, a spring member mounted between the head of said draw-down nut and said driven member for frictionally confining said friction ring intermediate said driven member and said radial flange upon tightening said draw-down nut, a stationary coil housing, said radial wall portion and said cylindrical wall portion each being located a predetermined air space apart from the side and peripheral wall portions of said coil housing, an electromagnetic coil mounted in said coil housing, a coil-wound spring mounted around said pulley hub member and said output hub member and having one end thereof secured to said output hub member, and an armature ring member mounted around the other end of said coil-wound spring and movable axially relative thereto, said armature ring member being located a predetermined air space apart from said radial wall portion of said pole member, said coil when energized drawing said armature ring member axially through said last-mentioned air space into frictional contact with said radial wall portion of said pole member without axially moving said other end of said coil-wound spring while causing said spring to grippingly engage said pulley hub member and said cylindrical collar to thereby drive said driven member, said friction ring, said output hub member, and said output shaft.

* * * * *

UNITED STATES PATENT AND TRADEMARK OFFICE
CERTIFICATE OF CORRECTION

PATENT NO. : 3,865,222
DATED : February 11, 1975
INVENTOR(S) : John R. Briar

It is certified that error appears in the above-identified patent and that said Letters Patent are hereby corrected as shown below:

Column 4, line 26, "output hub" should read -- driven --.

Column 4, line 64, "output hub" should read -- driven --.

Column 6, line 12, "output hub" should read -- driven --.

Signed and Sealed this

First Day of February 1977

[SEAL]

Attest:

RUTH C. MASON
Attesting Officer

C. MARSHALL DANN
Commissioner of Patents and Trademarks